United States Patent
Guilley et al.

(10) Patent No.: US 10,628,592 B2
(45) Date of Patent: Apr. 21, 2020

(54) METHODS FOR RECOVERING SECRET DATA OF A CRYPTOGRAPHIC DEVICE AND FOR EVALUATING THE SECURITY OF SUCH A DEVICE

(71) Applicant: INSTITUT MINES-TELECOM, Paris (FR)

(72) Inventors: Sylvain Guilley, Paris (FR); Annelie Heuser, Paris (FR); Olivier Rioul, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 223 days.

(21) Appl. No.: 15/529,048

(22) PCT Filed: Nov. 25, 2014

(86) PCT No.: PCT/IB2014/003248
§ 371 (c)(1),
(2) Date: May 23, 2017

(87) PCT Pub. No.: WO2016/083864
PCT Pub. Date: Jun. 2, 2016

(65) Prior Publication Data
US 2017/0270307 A1 Sep. 21, 2017

(51) Int. Cl.
*G06F 21/60* (2013.01)
*H04L 9/00* (2006.01)
(Continued)

(52) U.S. Cl.
CPC .......... *G06F 21/602* (2013.01); *G06F 21/556* (2013.01); *G06F 21/72* (2013.01);
(Continued)

(58) Field of Classification Search
CPC ................. G06F 21/556; G06F 21/602; G06F 21/72–725; G06F 21/75–755;
(Continued)

(56) References Cited

U.S. PATENT DOCUMENTS

| 7,587,044 B2 | 9/2009 | Kocher et al. | |
| 2015/0074159 A1* | 3/2015 | Poschmann | G09C 1/00 |
| | | | 708/270 |

OTHER PUBLICATIONS

Heuser et al. "Good is Not Good Enough-Deriving Optimal Distinguisher from Communication Theory," CHES 2014, LNCS 87311, pp. 55-74 (2014). (Year: 2014).*

(Continued)

*Primary Examiner* — Kevin Bechtel
(74) *Attorney, Agent, or Firm* — Baker & Hostetler LLP (57) ABSTRACT

A method for recovering secret data of a cryptographic device comprises: a) determining stochastic models of leakages relating respective measurable quantities to internal states or operations of the cryptographic device, the number of greater than the number of masks used by the cryptographic device to conceal the secret data; b) sending command sequences to the device, where each command sequence causes the device to perform a cryptographic operation on at least one respective plaintext using the secret data and the masks; c) during processing of each cryptographic operation, recording a series of measurements of measurable quantities; and d) computing an estimator of secret data by maximizing the conditional joint probability of the recorded measurements given the corresponding plaintexts, averaged over all possible values of the masks. A method for evaluating the security of a cryptographic device is provided.

7 Claims, 6 Drawing Sheets

(51) Int. Cl.
G06F 21/55 (2013.01)
G06F 21/72 (2013.01)
H04L 9/06 (2006.01)

(52) U.S. Cl.
CPC ............ H04L 9/002 (2013.01); H04L 9/0618 (2013.01); *H04L 2209/12* (2013.01)

(58) Field of Classification Search
CPC ..... G06F 2207/7219–7271; H04L 9/002–005; H04L 9/0618–0637
See application file for complete search history.

(56) References Cited

OTHER PUBLICATIONS

Henry C. Thode, Jr., "Testing for Normality," Statistics: textbooks and monographs, vol. 164, New York: Marcel Dekker, Inc., 2012, ISBN 0-8247-9613-6.

Jason Waddle et al., "Towards Efficient Second-Order Power Analysis," CHES, vol. 3156 of LNCS, pp. 1-15, Springer, 2004.

A. Heuser et al., "Good is Not Good Enough-Deriving Optimal Distinguisher from Communication Theory," CHES 2014, LNCS 87311, pp. 55-74 (2014).

Standaert et al., "How to Compare Profiled Side-Channel Attacks?" Applied Cryptography and Network Security, Jun. 2, 2009, pp. 485-498, XP019118316.

Silverman, "Density Estimation for Statistics and Data Analysis," Jan. 1, 1986, pp. 1-22, XP007916577.

Prouff et al., "Statistical Analysis of Second Order Differential Power Analysis," International Association for Cryptologic Research, vol. 20101221:152615, Dec. 18, 2010, pp. 1-12, XP061004375.

Oswald et al., "Template Attacks on Masking-Resistance is Futile," Jan. 1, 2007, Topic in Cryptology-CT-RSA 2007 Lecture Notes in Computer Science, pp. 243-256, XP019053628.

Martin Goldack, "Side-Channel based Reverse Engineering for Microcontrollers," Diplomarbeit, Ruhr-University Bochum, Jan. 9, 2008.

Paul C. Kocher et al., "Differential Power Analysis," In Proceedings of CRYPTO'99, vol. 1666 of LNCS, pp. 388-397, Springer-Verlag, 1999.

Tunstall et al., "Masking Tables—An Underestimated Security Risk," FSE, vol. 8424 of Lecture Notes in Computer Science, pp. 425-444, 2013.

Bhasin et al., "A Low-Entropy First-Degree Secure Provable Masking Scheme for Resource-Constrained Devices," Proceedings of the Workshop on Embedded Systems Security, WESS 2013, pp. 7:1-7:10.

Nikova et al., "Threshold Implementations Against Side-Channel Attacks and Glitches," ICICS 2006, pp. 529-545.

Veyrat-Charvillon et al., "Shuffling against Side-Channel Attacks: A Comprehensive Study with Cautionary Note," ASIACRYPT 2012, pp. 740-757.

\* cited by examiner

METHODS FOR RECOVERING SECRET DATA OF A CRYPTOGRAPHIC DEVICE AND FOR EVALUATING THE SECURITY OF SUCH A DEVICE

The invention relates to the field of security of cryptographic systems. More specifically, it relates to a method for recovering secret data, e.g. a secret, key of a cryptographic device, i.e. to a method of "attacking" the cryptographic device to gain access to concealed information. The invention also relates to a method for evaluating the security of a cryptographic system, i.e. its resistance to attacks aiming at gaining access to its key, or more generally to a secret information contained within said system.

Any embedded system, such as a smart card, that contains secrets, such as a cryptographic key $k^*$, is prone to so-called side-channel attacks, which proceed in two steps. First, a leakage (power consumption, electromagnetic radiations, processing time, etc.) is measured, which is a noisy signal dependent on internally manipulated data, some of which are sensitive, meaning that they depend on the secret key $k^*$ and on some plaintext or cipher-text (denoted by t). A distinguisher—i.e. a function of the measured leakages is then used to quantify the similarity between the measured leakage and an assumed leakage model. The result is an estimation $\hat{k}$ of the secret key $k^*$. In the literature, side-channel distinguishers are customarily presented as statistical operators that confront the leakage and the sensitive variable, both seen as random variables, in order to extract the secret key see e.g. U.S. Pat. No. 7,587,044. Different choices of distinguishers as statistical tools yield different performances, depending on the scenario: device, signal-to-noise ratio, noise distributions, leakage models, etc. More particularly, parameters such as the cryptographic algorithm implemented by the cryptographic device, its leakage model and the measurement platform used to measure leakages impact the quality of the distinguisher, i.e. its success rate, but in a way that is difficult to predict from theory. For instance, the noise distribution is a function of the algorithm (noise due to non-targeted sensitive variables), the device (analog countermeasures), and the acquisition platform («noise factor» of the probes).

Masking schemes have been introduced in order to secure embedded devices against side-channel attacks. A $d^{th}$-order masking scheme uses d "masks" (i.e. d random binary words) which are combined with the key and the plaintext, so that the leakages do not provide information on the key directly, but only on some combinations of the key and the masks. Masking makes side-channel analysis more complex, as an attack of order (d+1)—i.e. the measurement of (d+1)—separate leakages is required to retrieve the key.

One of the most common approaches for performing side channel analysis, both in the unmasked and in the masked case, is known as "Correlation Power Analysis" (CPA). It uses combination functions to transform the measured leakages into a single value in order to compute Pearson correlation coefficients; see e.g. the paper of Jason Waddle and David Wagner "Towards Efficient Second-Order Power Analysis", CHES, vol. 3156 of LNCS, pages 1-15, Springer, 2004, which relates to the masked case. Such an approach is rather empirical, and cannot be proved to be optimal in general. This is a serious problem in particular when CPA is used to evaluate the security of a cryptographic system: the fact that a system has proven sure against a particular attack, which is not proved to be optimal, does not ensure it will stand against a different sort of attack. Therefore, resistance to CPA attacks does not provide a reliable metrics of the security of a cryptographic system.

The paper by A. Heuser, O. Rioul and S. Guilley "Good is Not Good Enough—Deriving Optimal Distinguisher from Communication Theory", CHES 2014, LNCS 87311 pp. 55-74 (2014) applies concepts and methods from communication theory to derive optimal distinguishers in the unmasked case. This approach assumes knowledge of a model of the cryptographic device: this prevents its application to masked implementations, as masking has precisely the effect of introducing uncertainty into such a model.

The paper of E. Oswald and S. Mangard "Template Attacks on Masking—Resistance Is Futile", CT-RSA 2007, LNCS 4377 pp. 243 256 discloses a different form of side-channel analysis, called "template attack" and based on a maximum-likelihood approach, which is applied to a masked implementation. This approach, however, is limited to a very specific—and unrealistic—case: leakage given by a Hamming weight and noise having a multivariate normal distribution.

The invention aims at overcoming the above-mentioned drawbacks of the prior art. More precisely, it aims at providing an optimal distinguisher for performing efficient attacks on cryptographic devices making use of masking (in the framework of the invention, a distinguisher is considered optimal when it maximizes the success rate, i.e. the probability of recovering the correct value of the key). The invention also aims at providing an objective method for evaluating the security of a cryptographic device, i.e. its resistance to tampering by side-channel analysis.

An object of the present invention is a method for recovering secret data (e.g. a key, but other concealed pieces of information may be of interest e.g. a "tweak" or "nonce") of a cryptographic device according to claim 1.

Another object of the present invention is a method for evaluating the security of a cryptographic device according to claim 8, making use of said method for recovering secret data.

The dependent claims relate to particular embodiments of the invention.

Additional features and advantages of the present invention will become apparent from the subsequent description, taken in conjunction with the accompanying drawings, wherein.

A masking scheme is characterized by the number of random masks that are used per sensitive variable (a sensitive variable is a value stored or computed by the cryptographic device carrying information on the key or on any other secret data). In the following, a $d^{th}$-order masked implementation will be considered, with masks uniformly distributed over a space $\mathcal{M}$. Also, in the following only the case where the sensitive variable is a cryptographic key will be considered. Generalization to other secret data is straightforward.

In the following, calligraphic letters (e.g., $\mathcal{X}$) will denote sets, capital letters (e.g., X) will denote random variables taking values in these sets, and the corresponding lowercase letters (e.g., x) will denote their realizations. Let k* denote the secret cryptographic key, k any possible key hypothesis from the keyspace $\mathcal{K}$, and T be the input (ciphertext or plaintext) of the cryptographic algorithm. The mapping f: $(\mathcal{T};\mathcal{K};\mathcal{M}) \to \mathbb{F}_2^n$ maps the input $t \in \mathcal{T}$ a key hypothesis $k \in \mathcal{K}$ and the mask $m \in \mathcal{M}$ to an internally processed variable in some space $\mathbb{F}_2^n$ that is assumed to relate to a measured leakage X, where n is the number of bits. Concretely, $\mathbb{F}_2^n$ can be understood as the space of n-bit words. The composition of $\varphi$ and f is called the leakage model.

The measured leakage X can then be written as $$X = \varphi(f(T, k^*, M)) + N \quad (1)$$

where N denotes an independent and additive noise (not necessarily Gaussian) with zero mean and where $\varphi$ is a device-specific deterministic function.

In a $d^{th}$-order masking scheme the implementation is protected with d masks with corresponding leakages $$X^{(\omega)} = \varphi^{(\omega)}(f^{(\omega)}(T^{(\omega)}, k^*, M^{(\omega)})) + N^{(\omega)} \quad (2)$$

with $\omega \in \{0, \ldots, d\}$ and $M^{(\omega)} \in \mathcal{M}^{(\omega)}$ where the $\mathcal{M}^{(\omega)}$ do not need to be equal in general. The $f^{(\omega)}T^{(107)}, k^*, M^{(\omega)}$ are also referred to as "share". Accordingly, a dth-order masking scheme can be broken using $(d+1)^{th}$-order distinguishers by targeting d+1 leakages, or shares. For simplification, it will be written:

$$\gamma(T^{(\omega)}, k^*, M^{(\omega)}) = \varphi^{(\omega)}(f^{(\omega)}(T^{(\omega)}, k^*, M^{(\omega)}))$$

For example, a first order "software" (i.e. sequential) masking scheme uses one mask M and two shares M and Sbox[T⊕k*]⊕M (⊕ being the EXCLUSIVE OR—XOR—operator), and might leak with $$X^{(0)} = HW[M] + N^{(0)} \quad (3)$$

$$X^{(1)} = HW[\text{Sbox}[T \oplus k^*] \oplus M] + N^{(1)} \quad (4)$$

with Sbox: $\mathbb{F}_2^8 \to \mathbb{F}_2^8$ and $T = T^{(1)}$ being uniformly distributed over $\mathbb{F}_2^8$. Thus $\varphi^{(0)}(\cdot) = \varphi^{(1)}(\cdot) = HW[\cdot]$ (the Hamming weight function, equal to the number of "1" of the argument), $M^{(0)} = M^{(1)} = M$, $f^{(0)}(T, k, M) = M$ and $$f^{(1)}(T, k, M) = \text{Sbox}[T \oplus k] \oplus M.$$

According to a different example, assuming again a Hamming weight leakage model, a masking scheme using Sbox recomputation uses one mask and might leak with:

$$X^{(\omega)} = HW[\omega \oplus M] + N^{(\omega)}, \zeta\omega \in \{0, 1, \ldots, 2^n - 1\} \cong \mathbb{F}_2^n \quad (5)$$

$$X^{(2^n)} = HW[T \oplus k^* \oplus M] + N^{(2^n)} \quad (6)$$

This case will be considered in detail later.

Let the random variables $F^{(\omega)}(t, k)$ for for $\omega \in \{0, \ldots, d\}$ be defined by $F^{(\omega)}(t, k) = f^{(\omega)}(t, k, M^{(\omega)})$, and (t, k) be a fixed plaintext/key pair. Then, a masking scheme is said to be perfect at $d^{th}$ order if the joint distribution of maximum d of $F^{(0)}(t, k) \ldots F^{(d)}(t, k)$ is identically distributed of any pair $(t, k) \in \mathcal{T} \mathcal{K}$ The two examples above of first order software masking and Sbox recomputations are perfect masking schemes.

It is important to note that $d^{th}$-order security implies $1^{st}$, $2^{nd} \ldots (d-1)^{th}$-order security. Moreover it can be shown that whatever function $\psi \sum_{m^{(\omega)} \in \mathcal{M}^{(\omega)}} \psi(f^{(\omega)}(t, k, m^{(\omega)}))$ is independent from t and k for any $0 \leq \omega \leq d$.

In the following, it will be assumed that the attacker is able to measure q i.i.d. (independent and identically distributed) measurements, or "traces", of (d+1) measurable quantities which are related by leakages to internal states or operations ("intermediate variables") of the cryptographic device under attack. The masking order does not exceed d. All values indexed by $i \in \{1, \ldots, q\}$ are in bold face. Variables indexed by the intermediate variable index $\omega \in \{0, \ldots, d\}$ are denoted by $a^{(*)} = (a^{(0)}, \ldots, a^{(d)}) \in \mathcal{A}^{d+1}$. Moreover $a_i^{(\omega)} \in \mathcal{A}$ and $a^{(*)} \in \mathcal{A}^{q \times (d+1)}$. $\mathbb{P}(m) = \mathbb{P}(M=m)$ will denote a discrete probability distribution, "p" a probability density and $p_k(X|Y=y)$ will be the conditional probability density of random variable X when the random variable Y takes the value y, which in turn depends on a fixed key guess k. Assuming that the leakage model is known from the attacker, $p_k(X|Y=y) = p_k(X|T=t, M=m)$ when y=y(t, k, m). Moreover, $p_k(x|t, m)$ will be a shorter notation for $p(X=x|Y=\varphi(f(t, k, m)))$.

The scalar product between x and y will be denoted by $\langle x|y \rangle = \sum_{i=1}^q x_i y_i$; the Euclidean norm will be denoted as $\|x\|^2 = \sqrt{\langle x|x \rangle}$ and the component wise product $(x_1 y_1, \ldots, x_q y_q)$ as x·y.

Given a function g(k), $\text{argmax}_k g(k)$ will denote the value of k that maximized g(k). Finally, $\mathbb{1}_E: E \to \{0,1\}$ denotes the indicator function of set E.

Figure 1:
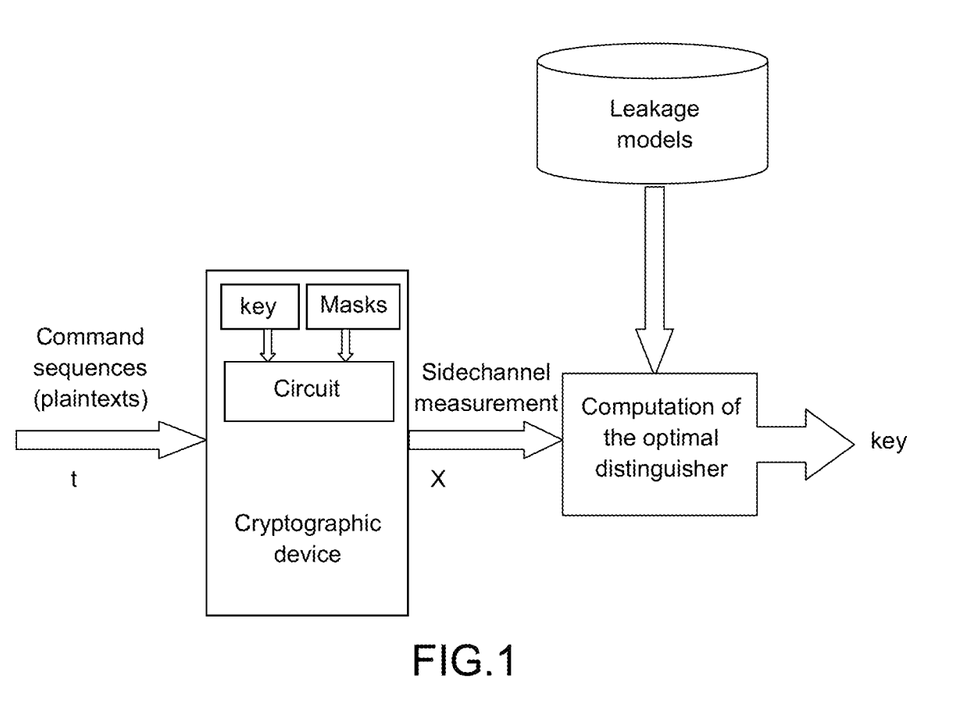
FIG. 1 is a schematic representation of the implementation of a method according to an embodiment of the invention.

FIG. 1 shows an exemplary implementation of a key recovering method according to an embodiment of the invention. Reference CD denotes a cryptographic device, such as a smart card, including a memory element storing a key, a memory element storing one or several masks (or a digital circuit generating pseudorandom masks) and a digital circuit receiving the key, the mask(s) and a plaintext t at its inputs, and processing them. More generally, the cryptographic device can receive at its input port(s) command sequences including the plaintext and commands determining the cryptographic processing performed by the digital circuit. The output of the cryptographic device is not directly used for performing an attack, although it can be used for preliminary characterization (see below); instead physical quantities x related to internal states or operations of the device are acquired using suitable sensors ("sidechannel measurements"). Such quantities may include e.g. a time-dependent power consumption and/or electromagnetic waves radiated by the device. Application of a leakage model to the sidechannel measurements allows the calculation of an "optimal distinguisher", which provides an estimate of the unknown cryptographic key.

The leakage model is a stochastic model, comprising a deterministic part and a stochastic part. The deterministic part of the model can be expressed as $\varphi \circ f$ where "∘" is the composition operator, "f" $(\mathcal{T};\mathcal{K};\mathcal{M}) \to \mathbb{F}_2^n$ the function mapping the plaintext $t \in T$ to an internally processed variable in $\mathbb{F}_2^n$ and $\varphi$ is the leakage function, while the stochastic part of the model corresponds essentially to the probability density function (PDF) of the measurement noise N—see above, equation (1). The deterministic part of the model can be derived by a detailed knowledge of the structure of the cryptographic device (usually available when the aim is to test the security of the device, rather than retrieving the key) or by a preliminary characterization step. The noise PDF is usually estimated during such a preliminary characterization step.

In order to perform a preliminary characterization (or "model acquisition", or "profiling") step, the device is placed in a so-called "acquisition setup" which is an experimental platform that is able:

to drive the device, i.e., to send commands to it, and optionally to receive answers; and to measure leakages such as power consumption or a radiated electromagnetic field.

Acquisition setups can either be designed from scratch, especially when the device to attack is non-standard, or it can be bought off-the-shelf from specialized vendors. Such vendors usually support form factors such as smartcards or USB tokens.

It is possible to test a code that corresponds to an "unfinished" device. For instance, this can be a module coded in Hardware Description Language (HDL) which is intended to be synthesized in an ASIC technology, but that is tested while being programmed in a reconfigurable device (called an FPGA). It is also possible to test a software code which is compiled for a microcontroller, different from the final target; still, the tests conducted on the non-final microcontroller can reveal some weaknesses against side-channel attacks. Such weaknesses might not remain on the final target, but still, the designer is warned about a potential problem. Non-final target acquisition setups can be referred to as "virtual targets".

As mentioned above, model acquisition, or "profiling" comprises:

1. getting the deterministic function $\varphi° f$, that depends on the device configuration (e.g., inputs, key, etc.)

2. getting the noise PDF, that is thus centered.

In some cases, the noise is acquired independently for each sample of a measurement, that is to say as a multivariate PDF.

It is important to note that the present invention requires an estimation of the exact noise PDF, while conventional sidechannel analysis methods only require an estimation of the first and second moments (i.e. means and standard deviation) of the noise distribution. This is also the case of the template attack method described in the above-referenced method by E. Oswald and S. Mangard.

The estimated noise PDF can have an analytical expression, or not; in the latter case, it is evaluated empirically, for example through the construction of histograms.

Methods of estimating noise PDF, which can be applied to the present invention, are known e.g. from:

Silverman, B. W. (1998). Density Estimation for Statistics and Data Analysis. London: Chapman & Hall/CRC, ISBN-13: 978-0412246203.

Henry C. Thode, Jr. (2002). Testing for Normality. New York: Marcel Dekker, Inc. p. 479. ISBN 0-8247-9613-6.

D'Agostino, R. B. and Stephens, M. A. Goodness-of-Fit Techniques. New York: Marcel Dekker. ISBN 0-8247-7487-6.

Methods for estimating the deterministic part $\varphi° f$ of the leakage model are known from the prior art, see e.g. the paper by François-Xavier Standaert, François Koeune and Werner Schindler "How to Compare Profiled Side-Channel Attacks?", Applied Cryptography and Network Security Lecture Notes in Computer Science Volume 5536, 2009, pp 485-498. The method disclosed by this paper consists in approximating the leakage function by a linear combination of base functions of the plaintext, key and masks with coefficients to be determined, and in estimating said coefficients by applying the least square methods to the measured leakages.

Once the leakage model has been acquired, $q \geq 1$ sidechannel measurement series ("traces") are performed using respective plaintexts (it is also possible to use several plaintexts for each trace). Each measurement series comprises the recording of $(d+1)$ measurements of respective physical quantities $X^{(\omega)}$ carrying information on the operation of the device, $(d+1)$ being larger than the order of the masking scheme. Advantageously, complete or incomplete knowledge of the internal operation of the cryptographic device can be used to choose sidechannel measurement whose mutual information with the key, considered as a random variable, is different from zero. If necessary, this knowledge may be obtained by reverse engineering, see e.g. Martin Goldack "Side-Channel based Reverse Engineering for Microcontrollers" Diplomarbeit, Ruhr-University Bochum Jan. 9, 2008 (https://www.emsec.rub.de/media/attachments/files/2012/10/da_goldack.pdf).

Figure 2A:
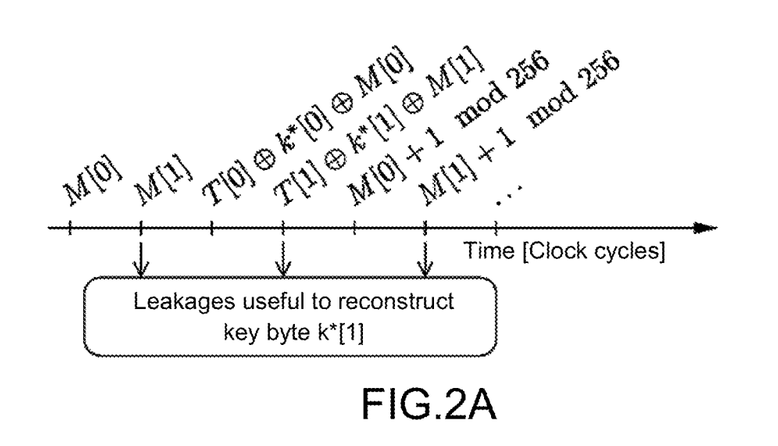
FIGS. 2A and 2B illustrate the choice of side-channel measurements used in respective implementations of the invention.
Figure 2B:
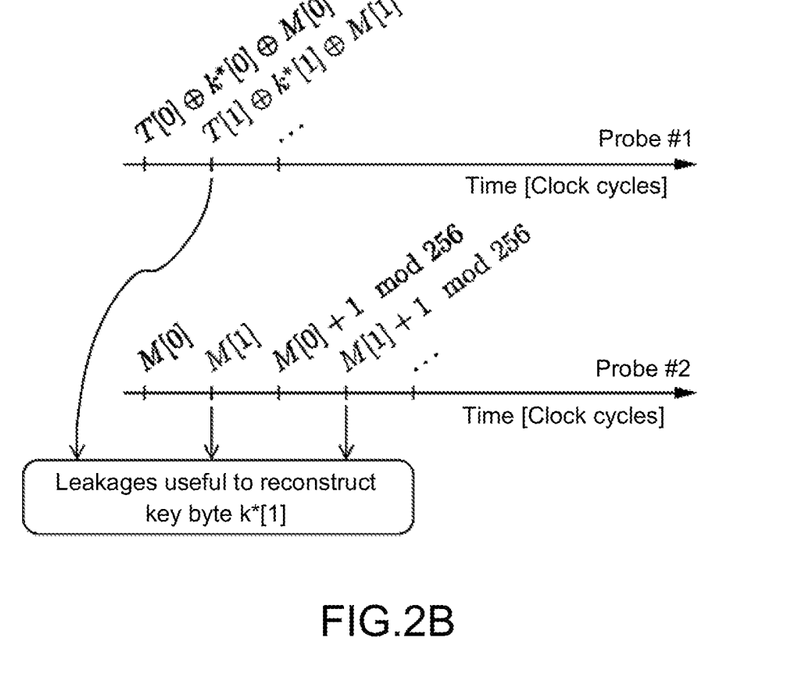

The use of knowledge of the internal operation of the cryptographic device will be illustrated with the help of two examples (see FIGS. 2A and 2B).

FIG. 2A illustrates an exemplary cryptographic processing performed sequentially and involving plaintexts T[b], keys k*[b] and masks M[b], where "b" indicates a byte number; each byte is encrypted using a key (the same for all the bytes) and a random mask (which changes from a byte to another). The intermediate variables which can leak are:

$Y^{(0)}[b]=M[b]$ is the drawing of the mask;

$Y^{(1)}[b]=T[b] \oplus k[b] \oplus M[b]$;

$Y^{(2)}[b]=M[b]+1 \bmod 256$ is the updating of the mask, for b=0, 1 etc.

Knowledge of the tuple (M[1]; T[1]⊕k*[1]⊕M[1]; M[1]+1 mod 256) contributes to the recovery of k*[1]: the mutual information between this tuple and the key k*[1] considered as a random variable is different from zero. Instead, the tuple (M[b]; T[b] ⊕k*[1]⊕M[b]; M[b]+1 mod 256) provides no useful information for recovering k*[1]. As the processing is sequential (or "software"), the leakages of M[1]; T[1]⊕k*[k]⊕M[1]; M[1]+1 mod 256 can be measured using a single probe (e.g. an electromagnetic probe); an appropriate timing of the measurements is required to ensure that informative data are acquired.

In the exemplary embodiment of FIG. 2B, the same cryptographic processing is performed in parallel. The leakages are measured using two spatially separated probes. Appropriate timing of the measurements and positioning of the probes are required to ensure that informative data are acquired.

Figure 3:
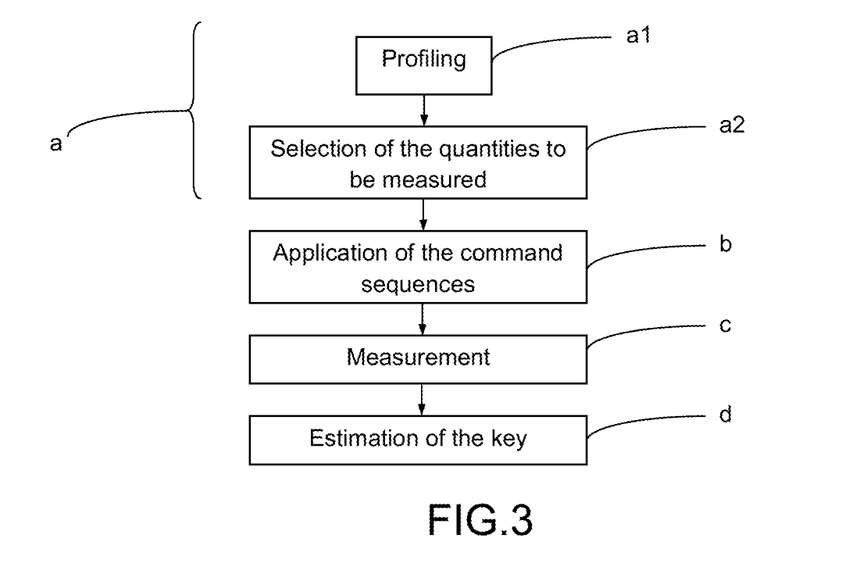
FIG. 3 is a flow chart of a method for recovering a key of a cryptographic device according to an embodiment of the invention.

FIG. 3 is a flow chart of a key recovery method according to the invention. The method comprises four steps a), b), c) and d):

Step a) comprises determining stochastic models of (d+1) measureable quantities (leakages). It comprises a sub-step of profiling the cryptographic device (a1) and a sub-step of selecting the leakages to be measured (a2). This step and its sub-steps have been described above.

Steps b) and c) comprise sending command sequences to the cryptographic device and performing side-channel measurements of the leakages modeled and selected at step a). These steps are conventional.

Step d) comprises estimating the key from the measurement traces acquired at step c) using an optimal distinguisher. This step will be described in detail later.

Figure 4:
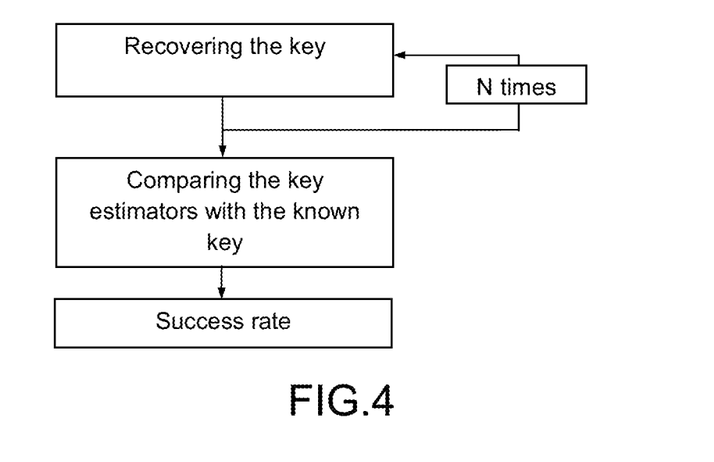
FIG. 4 is a flow chart of a method for evaluating the security of a cryptographic device according to another embodiment of the invention.

FIG. 4 illustrates the application of the key recovery method of FIG. 3 to the evaluation of the security level—i.e. the resistance to tamper by side-channel attacks—of a cryptographic device. It is supposed that the cryptographic key is known.

First of all, the key recovery method described above is applied. Of course, the knowledge of the key is not used— i.e. the key is fictively supposed to be unknown. The profiling step can be eased by a priori knowledge of the internal structure of the device; alternatively, this knowledge may be neglected in order to emulate the operation of a malicious attacker having no access to confidential technical information. This key recovery step is performed N times, with N>1 and preferably N>>1 (e.g. N≥10, preferably N≥100), using different acquisition traces. It is important to note that, when the key recovery step is performed for the $i^{th}$ time, information acquired in the previous (i−1) instances is neglected. This way, N estimations of the key are obtained. By comparing them with the known value k* of the key, it is possible to distinguish between true and wrong estimations. The success rate R is defined as $R=N_T/N$ where $N_T$ is the number of true estimations. The lower the success rate R, the higher is the security of the device. Given that the distinguisher according to the invention is optimal (i.e. leads to the highest possible success rate), R provides an objective metrics of security, for a fixed number of traces and supposing "perfect" profiling of the device.

According to the invention, the optimal distinguisher of the invention is obtained using a novel paradigm wherein, unlike in "template attacks" or in CPA, the cryptographic key k is considered as a random variable; this avoids the need of resorting to an arbitrary notion of "key guesses". More precisely, the cryptographic system under attack is modeled as a communication system wherein the key is transmitted through a noisy channel, whose noise has been characterized during the "model acquisition" step. The best key estimation is the one which has the maximum likelihood over all the admissible values of the key. The uncertainty in the "channel" model introduced by the mask is dealt with by maximizing the conditional joint probability of the side-channel measurements, given the corresponding plaintexts, averaged over all possible values of said masks.

In its most general form, the optimal distinguisher (also called "HOOD": high-order optimal distinguisher) $\mathcal{D}^d_{opt}$ according to the invention is given by:

$$\mathcal{D}^d_{opt}(x^{(*)}, t^{(*)}) = \underset{k \in \mathcal{K}}{\operatorname{argmax}} \prod_{i=1}^{q} \sum_{m^{(*)} \in \mathcal{M}^{(*)}} \mathbb{P}(m^{(*)}) \prod_{\omega=0}^{d} p_k(x_i^{(\omega)} | t_i^{(\omega)}, m^{(\omega)}) \quad (7)$$

It is reminded that:
q is the number of series of measurements performed;
d+1 is the number of measurable quantities which are measured;
k is a possible value of the key;
$\mathcal{K}$ is the set of all possible values of k;
$m^{(*)}$ is a set of (d+1) random variables modeling the mask or masks, $m^{(\omega)}$ being one of said random variables;
$\mathcal{M}^{(*)}$ is the set of all possible values of said (d+1) random variables;

$t_i^{(\omega)}$ is a plaintext associated to the i-th measurement series;
$t^{(*)}$ is a matrix of q(d+1) plaintexts;
P represents a probability distribution; most often, $P(m^{(*)})$ will be uniform, as all the mask value are equiprobable;
$p_k(x|t, m)$ represents the conditional probability that the leakage X takes the value x given t, k and m; otherwise stated $p_k(x|t, m)$ is a short notation for $p(X=x|Y=\varphi(f(t, k, m))$;
$x_i^{(\omega)}$ is a measurement series associated to the plaintext $t_i^{(\omega)}$; and
$x^{(*)}$ is a matrix of q(d+1) measurement results associated with the plaintexts of $t^{(*)}$.

In some implementations, matrix $t^{(*)}$ reduces to a vector of dimension q, because there is a single plaintext for each trace. An example where (d+1) different "plaintexts" are associated to each single trace is constituted by Sbox recomputation (see equations 5 and 6 above, and a detailed description below), where the addresses of the table to be masked constitute the plaintexts.

The model is assumed to be known—e.g. through profiling—for all the values of ω; the noises $N_i^{(\omega)}$ are assumed to be i.i.d. (but not necessarily Gaussians) across all the values of i={1 . . . q} and independent across the values of ω={0 . . . d}.

A proof of the optimality of $\mathcal{D}_{opt}$ will be provided for the case of second-order HOOD $\mathcal{D}^2_{opt}$ (i.e. the case d=2, d being the number of acquired leakages) which can be applied to first-order masking. In this case, equation (7) can be simplified to:

$$\mathcal{D}^2_{opt}(x^{(*)}, t^{(*)}) = \underset{k \in \mathcal{K}}{\operatorname{argmax}} \prod_{i=1}^{q} \sum_{m^{(*)} \in \mathcal{M}^{(*)}} \mathbb{P}(m^{(*)}) \prod_{\omega=0}^{1} p_k(x_i^{(\omega)} | t_i^{(\omega)}, m^{(\omega)}) \quad (8)$$

The proof of the optimality of $\mathcal{D}^2_{opt}$ is as follows. Let $\hat{k} = \operatorname{argmax}_{k \in K} D^2(x^{(*)}, t^{(*)})$. Then, using a frequentist approach, the success probability $P_s$ over all possible secret keys k is given by:

$$\mathbb{P}_s = \frac{1}{|\mathcal{K}|} \sum_{k \in \mathcal{K}} \mathbb{P}(\hat{k} = k)$$

$$= \frac{1}{|\mathcal{K}|} \sum_{k \in \mathcal{K}} \sum_{t^{(*)}} \mathbb{P}(t^{(*)}) \mathbb{P}(\hat{k} = k | T^{(*)} = t^{(*)})$$

$$= \frac{1}{|\mathcal{K}|} \sum_{k \in \mathcal{K}} \sum_{t^{(*)} \in \tau^{q \times (d+1)}} \mathbb{P}(t^{(*)}) \int_{\chi^{q \times (d+1)}} p_k(x^{(*)} | t^{(*)}) \mathbb{1}_{k=\hat{k}} dx^{(*)}$$

$$= \frac{1}{|\mathcal{K}|} \sum_{t^{(*)} \in \tau^{q \times (d+1)}} \mathbb{P}(t^{(*)}) \int_{\chi^{q \times (d+1)}} p_k(x^{(*)} | t^{(*)}) dx^{(*)}$$

In the second term, $\mathbb{P}(\hat{k}=k|t^{(*)})$ has to be computed, where $\hat{k}=\hat{k}(x^{(*)}, t^{(*)})=\operatorname{argmax}_{k \in K} \mathcal{D}^2(x^{(*)}, t^{(*)})$ is a function of $x^{(*)}$ and $t^{(*)}$. This is therefore a probability on the random variable $X^{(*)}$ knowing $p_{k(x^{(*)}|t^{(*)})}$. Like for every probability taken of a random variable with density, the required probability is the integral of density over the events. So:

$$\mathbb{P}(\hat{k}(x^{(*)}, t^{(*)})=k|t^{(*)})=\int p_k(x^{(*)}|t^{(*)}) dx^{(*)}$$

where the integral is taken over all $x^{(*)}$ such that $\hat{k}(x^{(*)}, t^{(*)})=k$; this is the indicator in the third term.

Now, $\mathbb{P}(t^{(*)})$ is independent of the key. Thus, for each given sequence $x^{(*)}$, $t^{(*)}$, maximizing the success rate amounts to choose $k=\hat{k}$ such that $p_k(x^{(*)}|t^{(*)})$ is maximized. Moreover:

$$p_k(x^{(*)}|t^{(*)}) = \prod_{i=1}^{q} p_k(x_i^{(*)}|t_i^{(*)})$$

$$= \prod_{i=1}^{q} \sum_{m^{(*)} \in \mathcal{M}^{(*)}} \mathbb{P}(m^{(*)}) p_k(x^{(*)}|t_i^{(*)}, m^{(*)})$$

$$= \prod_{i=1}^{q} \sum_{m^{(*)} \in \mathcal{M}^{(*)}} \mathbb{P}(m^{(*)}) \prod_{\omega=0}^{1} p_k(x_i^{(\omega)}|t_i^{(\omega)}, m^{(\omega)})$$

The third term has been obtained from the second by considering that the noises $N_i^{(\omega)}$ are assumed to be i.i.d. across all the values of $i=\{1 \ldots q\}$ and independent across the values of $\omega=\{0 \ldots d\}$. Taking the $$\underset{k \in \mathcal{K}}{\operatorname{argmax}}$$

of the third term above gives $\mathcal{D}^2{}_{opt}$ cf. (8)—which is optimal in the sense that it maximizes the success rate.

Generalization to the case of an arbitrary value of d is trivial.

Equation (7) takes a simpler form is the noises are Gaussian and centered and with identical variances i.e. $N_i^{(\omega)} \sim \mathcal{N}(0, \sigma_\omega^2)$:

$$\mathcal{D}_{opt}^{d,G}(x^{(*)}, t) = \qquad (9)$$
$$\underset{k \in \mathcal{K}}{\operatorname{argmax}} \sum_{i=1}^{q} \log \left\{ \sum_{m^{(*)} \in \mathcal{M}^{(*)}} \exp \left\{ \sum_{\omega=0}^{d} \frac{1}{\sigma^{(\omega)2}} \left( x_i^{(\omega)} y_i^{(\omega)} - \frac{1}{2} y_i^{(\omega)2} \right) \right\} \right\}$$

t is a vector of q plaintexts, associated to respective measurement series;

m is a random variable modeling said or one said mask;

$\mathcal{M}$ is the set of all possible values of m;

$y^{(\omega)}$ is a vector of (d+1) values of y which is a random variable expressing the leakage associated to the $t_i^{(\omega)}$ plaintext neglecting noise; and $\sigma^{(\omega)}$ is the variance of a measurement noise affecting $x_i^{(\omega)}$, assumed to be zero-centered and normally distributed.

Moreover, in the limit of high noise level (variance) $\mathcal{D}^{d,G}_{opt}$ can be approximated by:

$$\mathcal{D}_{opt}^{d,G,\sigma\uparrow}(x^{(*)}, t) = \underset{k}{\operatorname{argmax}} \prod_{i=1}^{q} \sum_{m \in \mathcal{M}} \exp \left\{ \sum_{\omega=0}^{d} \frac{1}{\sigma^{(\omega)2}} x_i^{(\omega)} y_i^{(\omega)} \right\} \qquad (10)$$

While, in the case of low noise level (variance) it can be approximated by $$\mathcal{D}_{opt}^{d,G,\sigma\downarrow}(x^{(*)}, t) = \underset{k \in \mathcal{K}}{\operatorname{argmin}} \sum_{i=1}^{q} \max_{m \in \mathcal{M}} \sum_{\omega=0}^{d} (x_i^{(\omega)} - y_i^{(\omega)})^2 \qquad (10')$$

Figure 5A:
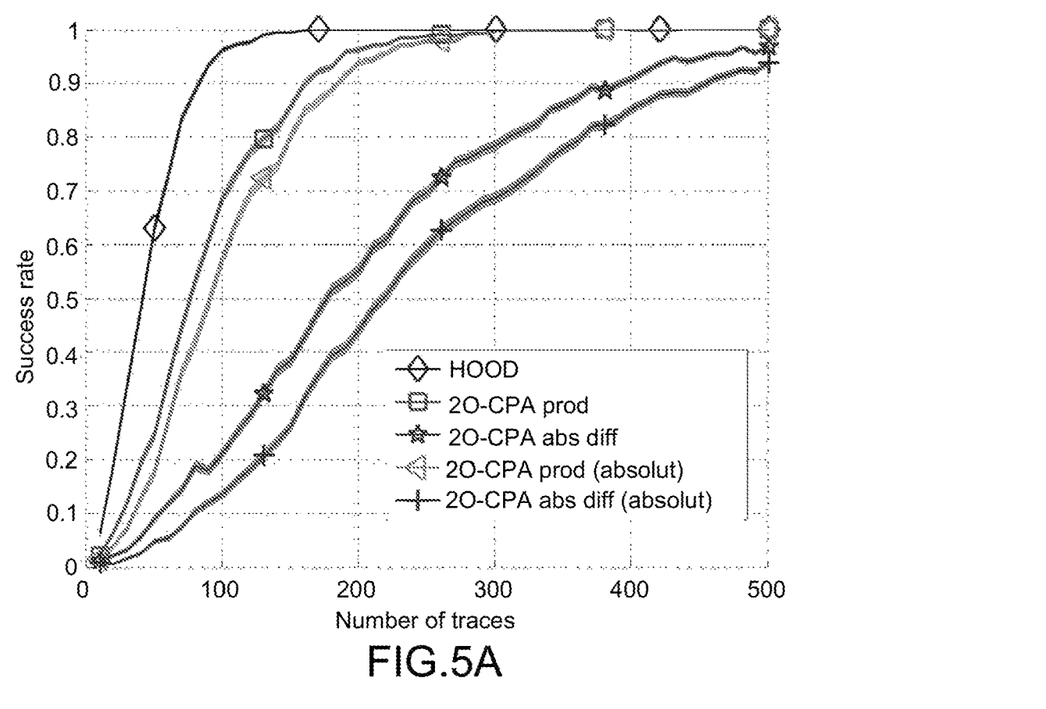
FIGS. 5A, 5B and 5C are plots of the success rates for second order attacks carried out according to an embodiment of the invention and to several methods known from the prior art, in the case of a first-order masking scheme with Hamming weight leaks and Gaussian noise for a standard deviation of 0.5 and 4 (simulations), and for real measurement.
Figure 5B:
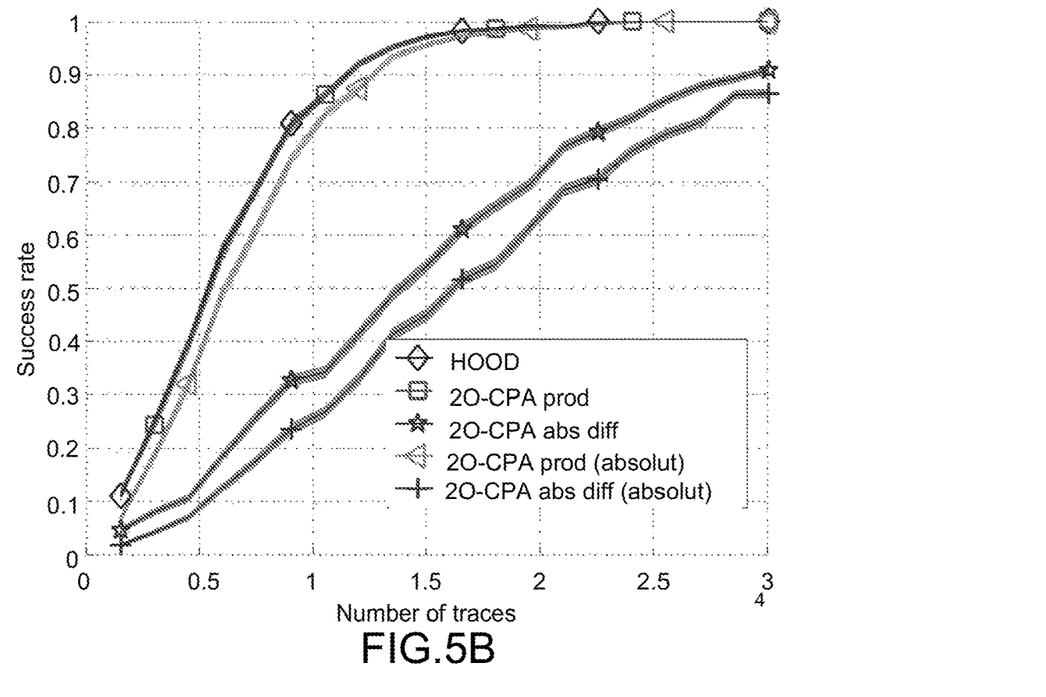

The inventive key recovering method has been validated by using simulations of a first-order masking scheme with leakage models of the Hamming weight type (see the equations 3 and 4 above). Noise was considered to be zero-mean Gaussian, with identical standard deviations $\sigma$ for all the measurements. To ensure reliability, 500 experiments were conducted with uniformly distributed keys k* to compute the empirical success rate. The results are illustrated on FIGS. 5A (for $\sigma=0.5$) and 5B (for $\sigma=4$). The HOOD is compared with different kind of known CPA combination functions:

Product $c_X^{prod}(X^{(0)}, X^{(1)}) = X^{(0)} \cdot X^{(1)}$

Absolute difference: $c_X^{diff}(X^{(0)}, X^{(1)}) = |X^{(0)} - X^{(1)}|$

"prod (absolut)" and "abs diff (absolut)" correspond to the same combination functions, except that the absolute value of the computed coffelation coefficient is used instead of the correlation coefficient itself.

It can be seen that the HOOD outperforms the methods known from the prior art, particularly in the case of low noise level.

Figure 5C:
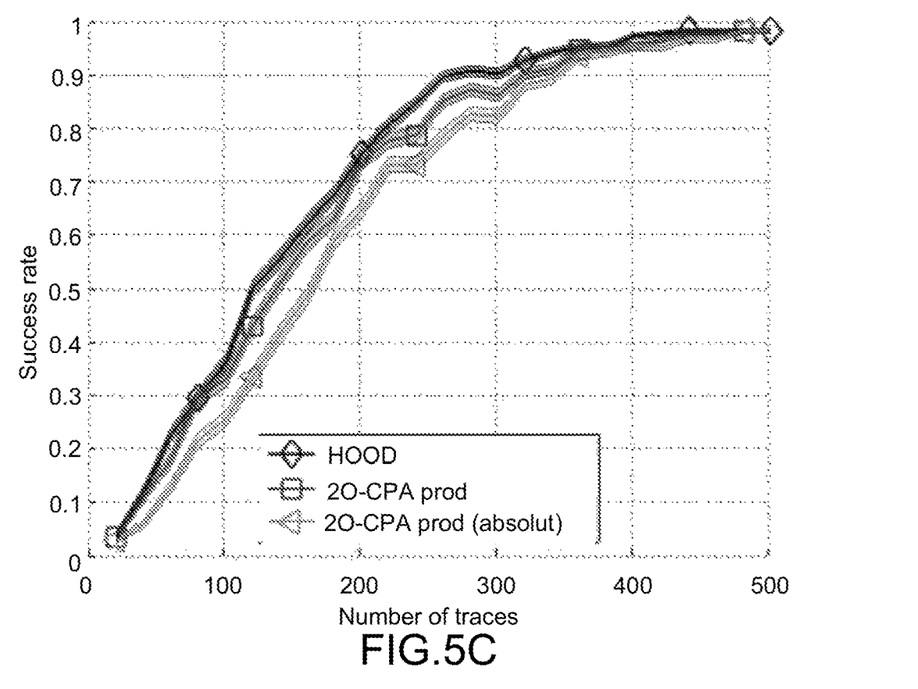

FIG. 5C shows the success rate obtained experimentally using the real-world measurements of the DPA Contest, 4$^{th}$ edition (2013-2014): http://www.DPAcontest.org/v4/, with the leakage:)

$$X^{(0)} = \varphi^{(0)}(\text{Sbox}[T^{(0)} \oplus k^*] \oplus M) + N^{(0)}$$

$$X^{(1)} = \varphi^{(1)}(T^{(1)} \oplus M) + N^{(1)}$$

The models $\varphi^{(0)}$ and $\varphi^{(1)}$ have been profiled using a regression.

The plaintexts $T^{(0)}$ and $T^{(1)}$ correspond to two adjacent bytes of the plaintext.

The reference acquisition campaign has been performed during June and July 2013 in the security laboratory the Digital Electronic Systems research group of Télécom ParisTech. The AES-256 RSM was implemented on an ATMega-163 smart-card connected to a SASEBO-W board. For the acquisitions, the following devices were used:

Langer EM near-field probe RF U 5-2.

Preamplifier PA303 30dB ~0-3GH.

Oscilloscope Lecroy Waverunner 6100A, sampling frequency=500 MS/s.

Regulated Power Supply Agilent E3631A@2.5V to power the smart-card.

Another interesting case is that of centered uniform noise of variance $\sigma^2$. The distribution of a random variable N obeying such a distribution is $P(N=n) = U_\sigma(n)$, where:

$$U_\sigma(n) = \begin{cases} \dfrac{1}{2\sigma\sqrt{3}} & \text{if } n \in [-\sqrt{3}\,\sigma, +\sqrt{3}\,\sigma] \\ 0 & \text{otherwise} \end{cases}$$

If the non-deterministic part of the (d+1) measurements is a uniform noise then:

$$\mathcal{D}_{opt}^{d,U}(x^{(*)}, t^{(*)}) =$$
$$\underset{k \in \mathcal{K}}{\operatorname{argmax}} \prod_{i=1}^{q} \sum_{m^{(*)} \in \mathcal{M}^{(*)}} \mathbb{P}(m^{(*)}) \prod_{\omega=0}^{d} U_{\sigma(\omega)}(x_i^{(\omega)} - \varphi(f(t_i^{(\omega)}, k, m^{(\omega)})))$$

$$\underset{k \in \mathcal{K}}{\mathrm{argmax}} \prod_{i=1}^{q} \sum_{m^{(*)} \in \mathcal{M}^{(*)}} \mathbb{P}(m^{(*)}) \frac{\delta_{x_i^{(*)} - \varphi(f(t_i^{(*)}, k, m^{(*)}))}}{2\sqrt{3}\,\sigma} \in C,$$

where δ is Kronecker's delta and C is the (d+1)-dimensional cube centered on (0; . . . ; 0) and of unitary side length.

A particularly interesting application of the inventive method concerns the case of a cryptographic device implementing a masking scheme using Sbox recomputation (cf. equation 5 and 6)—see:

Paul C. Kocher, Joshua Jaffe, and Benjamin Jun "Differential Power Analysis" In Proceedings of CRYPTO'99, volume 1666 of LNCS, pages 388-397. Springer-Verlag, 1999. The masking algorithm is, in pseudocode:

```
input: t (one byte of plaintext) and k (one byte of key)
output: The application of AddRoundKey and SubBytes on t, i.e., S(t ⊕ k)
 1   m ←_R F₂ⁿ, m' ←_R F₂ⁿ // Draw of random input and output masks ;
 2   for ω ∈ {0,1,...,2ⁿ-1} do // Sbox masking
 3     z ← ω ⊕ m // Masked input ;
 4     z' ← S[ω] ⊕ m' // Masked output ;
 5     S' [z] ← z' // Creating the masked Sbox entry ;
 6   end
 7   t ← t ⊕ m // Plaintext masking ;
 8   t ← t ⊕ k // Masked AddRoundKey ;
 9   t ← S' [t] // Masked SubBytes ;
10   t ← t ⊕ m' // Demasking ;
11   return t
```

The words length of all data is indicated as n, typically, n=8 bit for AES. Two random masks m and m' are drawn initially from $\mathbb{F}_2^n$ and all the data manipulated by the algorithm are exclusive-ored with one of the two masks. Masking the plaintext is straightforward (see line 7). Key addition can be done safely as a second step, as the plaintext is already masked (see line 8). Passing through the Sbox is less obvious, as this operation is non-linear. Therefore, the Sbox is recomputed masked, as shown on lines 2 to 5: a new table S0, that has also size 2n×n bits, is required for this purpose. In the Sbox precomputation step (lines 2 to 5), the key byte k is not manipulated. The leakage only concerns the mask.

In a conventional approach (see Emmanuel Prouff, Matthieu Rivain, and Régis Bevan "Statistical Analysis of Second Order Differential Power Analysis" IEEE Trans. Computers, 58(6):799-811, 2009), the attacker acquires d=$2^n$ leakages, occurring during the Sbox recomputation:

$$X^{(0)} = \varphi^{(0)}(M) + N^{(0)}$$
$$X^{(1)} = \varphi^{(1)}(M \oplus 1) + N^{(1)}$$
$$\vdots$$
$$X^{(2^n-1)} = \varphi^{(2^n-1)}(M \oplus (2^n - 1)) + N^{(2^n-1)}$$

and computes a combination function of said leakages.

In an embodiment of the invention, the attacker acquires all the leaking samples during precomputation, i.e. $y_i^{(\omega)} = \varphi(\omega \oplus m)$ that are independent of i for $0 \leq \omega \leq (2^n - 1)$ and, second, the leakage arising from the combination of the mask m, plaintext $t_i$ and the key, i.e. $y_i^{(2^n)} = \varphi(t_i \oplus k \oplus m)$. Thus, all terms for $\omega \neq 2n$ do not depend on the key. Assuming Gaussian centered noises with identical variances, $N_i^{(\omega)} \sim \mathcal{N}(0, \sigma_\omega^2)$ i.i.d. across values of i={1, . . . , d} and independent across values of $\omega = \{0, \ldots, 2^n\}$ an expression for the HOOD for masking tables can be deduced from (9) and is given by:

$$\mathcal{D}_{opt}^{mt,G}(x^{(*)}, t) = \underset{k \in \mathcal{K}}{\mathrm{argmax}} \quad (11)$$

$$\sum_{i=1}^{q} \log \left\{ \sum_{m \in \mathbb{F}_2^n} \exp\left\{ \sum_{\omega \in \mathbb{F}_2^n} \frac{1}{\sigma^{(\omega)2}} \left( x_i^{(\omega)} \varphi(\omega \oplus m) - \frac{1}{2} \varphi^2(\omega \oplus m) \right) + \right. \right.$$

$$\left. \left. \frac{1}{\sigma^{(2^n)2}} \left( x_i^{(2^n)} \varphi(t_i \oplus m \oplus k) - \frac{1}{2} \varphi^2(t_i \oplus m \oplus k) \right) \right\} \right\}$$

In the limit of low noise, equation (10) can be applied.
More generally, if the noise is not (or not necessarily) Gaussian, the HOOD is given by:

$$\mathcal{D}_{opt}^{mt}(x^{(*)}, t) = \quad (12)$$

$$\underset{k \in \mathcal{K}}{\mathrm{argmax}} \prod_{i=1}^{q} \sum_{m \in \mathbb{F}_2^n} \mathbb{P}(m) \prod_{\omega \in \mathbb{F}_2^n} p(X^{(\omega)} = x_i^{(\omega)} \mid Y^{(\omega)} = \varphi(\omega \oplus m)) \times$$

$$p(X^{(2^n)} = x_i^{(2^n)} \mid Y^{(2^n)} = \varphi(t_i \oplus k \oplus m))$$

This embodiment of the inventive key recovering method has been experimentally validated by using simulations of a first order masking scheme with precomputation tables.

In particular, the XOR operation in the precomputation phase and the AddRoundKey of the algorithm have been targeted, so that the leakages are those of equations (5) and (6).

Targeting the AddRoundKey phase has some advantages. First, it allows performing the evaluation on only four bits without the loss of generality of using a four bits Sbox. Second, in some Sbox precomputation algorithm the output masks are different for each entry of the Sbox and therefore cannot be combined with the mask of the precomputation table; however, the attacker can still take advantage of the $2^n$ leakages of the masked inputs of the Sbox combined with the leakage of the AddRoundKey operation.

Figure 6A:
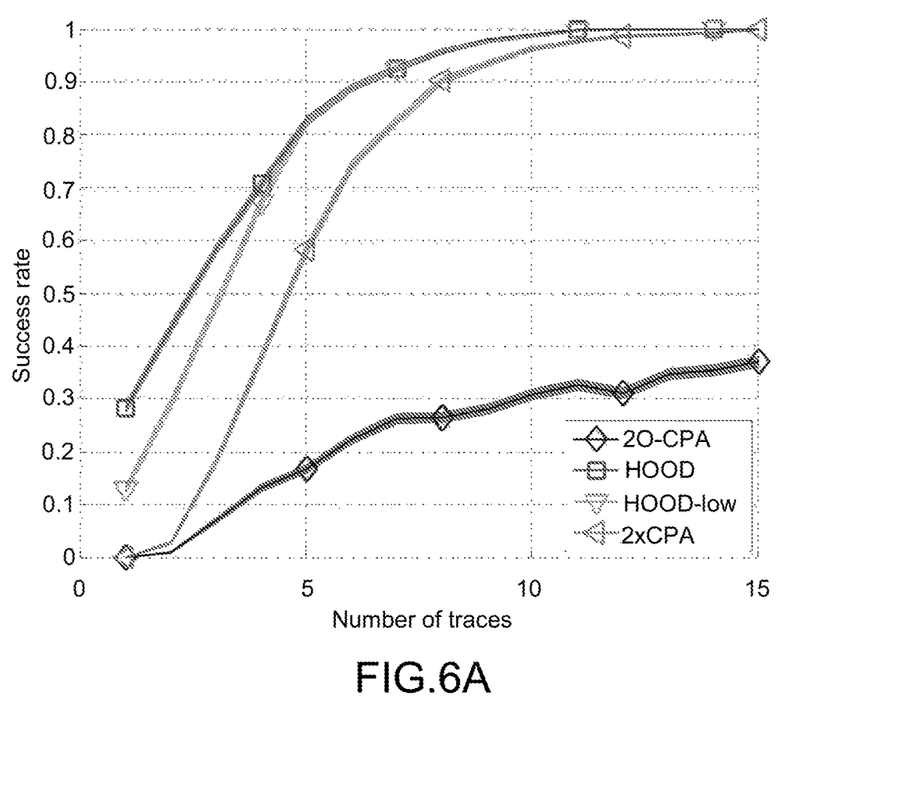
FIGS. 6A and 6B are plots of the success rates for attacks carried out according to an embodiment of the invention and to several methods known from the prior art, in the case of a device using a pre-computed masking table with Gaussian noise.
Figure 6B:
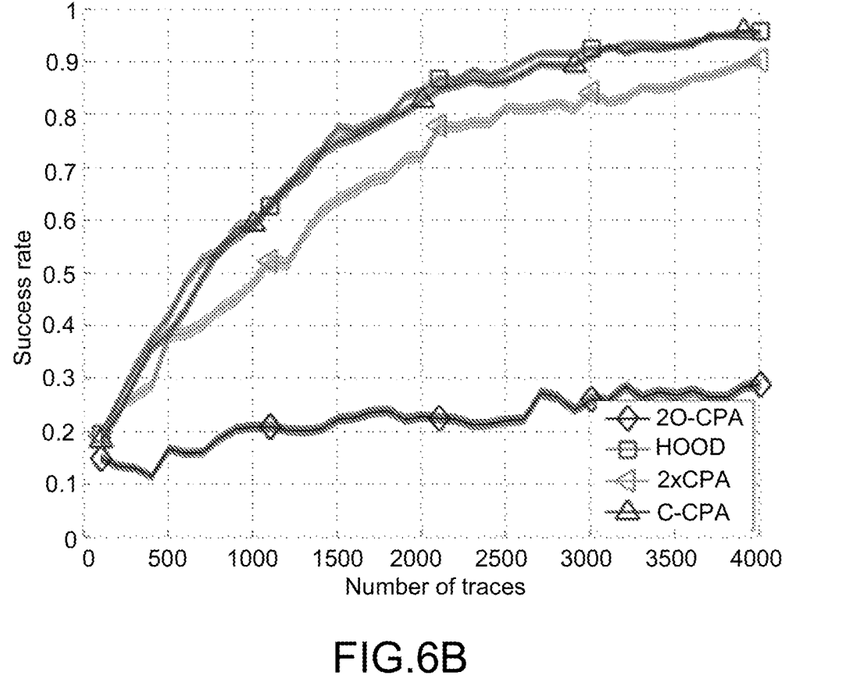

Similarly to the previous experiments, T is uniformly distributed over $\mathbb{F}_2^4$ (only 4 bits are considered for computational reasons) and the noise arises from a Gaussian distribution $N \sim \mathcal{N}(0, \sigma^2)$ for $\sigma^{(0)} = \ldots \sigma^{(16)} \in \{0, 5, 5\}$. Again to compute the success rate, 500 independent experiments were performed with uniformly distributed k*. FIGS. 6A and 6B, relating to the cases σ=0.5 and σ=5 respectively, illustrate the success rate obtained using the HOOD of equation (11), the approximated low-noise expression (10) and different prior art techniques, namely $2^{nd}$ order CPA (2O-CPA) with normalized product combination function, the so-called 2-stage CPA (2xCPA), see Michael Tunstall, Carolyn Whitnall, and Elisabeth Oswald. Masking Tables "An Underestimated Security Risk" In Shiho Moriai, editor, FSE, volume 8424 of Lecture Notes in Computer Science, pages 425-444. Springer, 2013, and a combination of higher-order CPA (C-CPA). It can be seen that the true and approximated HOOD outperform the prior art methods, except C-CPA which is equivalent to the HOOD in the high-noise limit.

Another interesting embodiment of the invention is the application of the inventive optimal distinguisher to low-entropy masking schemes (LEMS). This is a masking scheme where the masks can take on only few values. For instance, on $\mathbb{F}_2^n$ one can imagine a LEMS that takes only two values, namely $0=(0, 0 \ldots 0)_2$ and $1=(1, 1 \ldots 1)_2$. See Shivam Bhasin, Jean-Luc Danger, Sylvain Guilley, and Zakaria Najm "A Low-Entropy First-Degree Secure Provable Masking Scheme for Resource-Constrained Devices" in Proceedings of the Workshop on Embedded Systems Security, WESS '13, pages 7:1-7:10, New York, N.Y., USA, September 292013. ACM. Montreal, Quebec, Canada. The corresponding Hamming weight leakage model is then:

$$X = w_H(SB(T \oplus k^*) \oplus M) + N \quad (13)$$

Where:
$T \in \mathbb{F}_2^n$ is the plaintext;
$k^* \in \mathbb{F}_2^n$ is the actual key;
SB: $\mathbb{F}_2^n \to \mathbb{F}_2^n$ is the substitution box (also noted Sbox);
$w_H$: $\mathbb{F}_2^n \to [\![0, n]\!]$ is the Hamming weight function;
$N \in \mathcal{N}(0, \sigma^2)$ is the noise; and
M is a random variable uniformly distributed in $\{0,1\}$. It can be seen that:

$$S(T \oplus k^*) \oplus M = \begin{cases} SB(T \oplus k^*) & \text{if } M = 0 \\ \neg SB(T \oplus k^*) = n - SB(T \oplus k^*) & \text{if } M = 1 \end{cases} \quad (14)$$

Where $\neg$ is the "NOT" operator.
Let S be the equiprobable random variable equal to:

$$s = \begin{cases} -1 & \text{if } M = 0 \\ +1 & \text{if } M = 1 \end{cases} \quad (15)$$

Then:

$$X = S \times w_H(SB(T \oplus k^*)) - n/2) + N' \quad (16)$$

Where $N' \sim \mathcal{N}(n/2, \sigma^2)$.
Let $\tilde{w}_H$ be the centered Hamming weight (i.e. the Hamming weight minus n/2, where n is the number of bits).
It can be shown that, in this case, the equation (7) of the optimal distinguisher can be written as $$\mathcal{D}_{opt}^{LEMS} = \arg\max_k \sum_{i=1}^{q} -\tilde{\omega}_H(SB(t_i \oplus k))^2 + \ln\cosh\frac{x_i \tilde{w}_H(SB(t_i \oplus k))}{2\sigma^2}$$

The proof is as follows:

$$\hat{k} = \arg\max_k \prod_{i=1}^{q} \sum_{s \in \{\pm 1\}} p(x_i \mid t_i, k, s)$$

$$= \arg\max_k \prod_{i=1}^{q} \sum_{s \in \{\pm 1\}} p(x_i - s \times \tilde{w}_H(SB(t_i \oplus k)))$$

$$= \arg\max_k \prod_{i=1}^{q} \sum_{s \in \{\pm 1\}} \exp - \frac{(x_i - s \times \tilde{w}_H(SB(t_i \oplus k)))^2}{2\sigma^2}$$

$$= \arg\max_k \prod_{i=1}^{q} \left( \exp - \frac{(x_i - \tilde{w}_H(SB(t_i \oplus k)))^2}{2\sigma^2} + \exp - \frac{(x_i - \tilde{w}_H(SB(t_i \oplus k)))^2}{2\sigma^2} \right)$$

$$= \arg\max_k \prod_{i=1}^{q} \exp - \frac{x_i^2}{2\sigma^2} \exp - \frac{\tilde{w}_H(SB(t_i \oplus k))^2}{2\sigma^2}$$

$$\left( \exp - \frac{x_i \tilde{w}_H(SB(t_i \oplus k))}{2\varphi^2} + \exp + \frac{x_i \tilde{w}_H(SB(t_i \oplus k))}{2\varphi^2} \right)$$

$$= \arg\max_k \prod_{i=1}^{q} \exp - \frac{\tilde{w}_H(SB(t_i \oplus k))^2}{2\sigma^2} \times 2\cosh\frac{x_i \tilde{w}_H(SB(t_i \oplus k))}{2\sigma^2}$$

$$= \arg\max_k \sum_{i=1}^{q} -\tilde{\omega}_H(SB(t_i \oplus k))^2 + \ln\cosh\frac{x_i \tilde{w}_H(SB(t_i \oplus k))}{2\sigma^2}.$$

The invention has been disclosed with reference to a number of exemplary embodiments. However, these embodiments are not limitative, and equation (7) may be applied to other situations where the circuit under analysis is protected thanks to random numbers. This includes a large variety of masking schemes, such as the threshold implementation (Svetla Nikova, Christian Rechberger, Vincent Rijmen: "Threshold Implementations Against Side-Channel Attacks and Glitches", ICICS 2006: 529-545), or even "shuffling countermeasures" (such as: Nicolas Veyrat-Charvillon, Marcel Medwed, Stéphanie Kerckhof, François-Xavier Standaert: "Shuffling against Side-Channel Attacks: A Comprehensive Study with Cautionary Note". ASIA-CRYPT 2012: 740-757).

Masking countermeasure has been illustrated in the two examples on symmetric ciphers: equations. (3) and (4), and equations (5) and (6). However, masking can be applied to a large variety of cryptographic primitives. For instance, asymmetric cryptography, when used in decryption or signature modes, makes use of the secret key, hence is vulnerable to side-channel attacks. The Rivest-Shamir-Adleman (RSA) cryptosystem, for example, can be protected by different kinds of masking: input message (ciphertext blinding), key (exponent blinding) or representation (modulus blinding). Equation (7) also applies in this case.

The invention claimed is:
1. A method for recovering secret data of a cryptographic device, said device containing at least a memory element storing secret data, a module for storing or generating at least one mask and a circuit configured to perform cryptographic operations using said secret data and said mask or masks, the method comprising:
   a) determining stochastic models of a plurality of leakages relating respective measurable quantities to internal states or operations of said cryptographic device, the number of said leakages being greater than the number of said masks;
   b) sending a plurality of command sequences (t) to said device, where each said command sequence causes said device to perform a cryptographic operation on at least one respective plaintext using said secret data and said mask or masks;
   c) during processing of each said cryptographic operation, recording a series of measurements (x) of said measurable quantities; and
   d) computing an estimator of said secret data by maximizing the conditional joint probability of the recorded measurements given the corresponding plaintexts, averaged over all possible values of said masks, wherein the estimator of the computed secret data is given by:

$$\mathcal{D}_{opt}^d(x^{(*)}, t^{(*)}) = \underset{k \in \mathcal{K}}{\operatorname{argmax}} \prod_{i=1}^{q} \sum_{m^{(*)} \in M^{(*)}} \mathbb{P}(m^{(*)}) \prod_{\omega=0}^{d} p_k(x_i^{(\omega)} | t_i^{(\omega)}, m^{(\omega)})$$

Where:
q is the number of series of measurements performed;
d+1 is the number of measurable quantities which are measure;
k is a possible value of the secret data;
K is the set of all possible values of k;
$m^{(*)}$ is a set of (d+1) random variables modeling the mask or masks, $m^{(\omega)+}$ being one of said random variables;
$M^{(*)}$ is the set of all possible values of said (d+1) random variables;
$t_i^{(\omega)}$ is a plaintext associated to the i-th measurement series;
$t^{(*)}$ is a matrix of q(d+1) plaintexts;
R represents a probability distribution;
$p_k(x|t,m)$ represents the conditional probability that the leakage X takes the value x given t,k and m;
$x_i^{(\omega)}$ is a measurement series associated to the plaintext $t_i^{(\omega)}$; and
$x^{(*)}$ is a matrix of q(d+1) measurement results associated with the plaintexts of $t^{(*)}$.

2. The method according to claim 1 wherein said step a) comprises estimating the probability density function of the noise affecting the measurements of said measurable quantities.

3. The method according to claim 1 wherein the estimator of the secret data is given by:

$$\mathcal{D}_{opt}^{d,G}(x^{(*)}, t) = \underset{k \in \mathcal{K}}{\operatorname{argmax}} \sum_{i=1}^{q} \log \left\{ \sum_{m^{(*)} \in M^{(*)}} \exp \left\{ \sum_{\omega=0}^{d} \frac{1}{\sigma^{(\omega)2}} \left( x_i^{(\omega)} y_i^{(\omega)} - \frac{1}{2} y_i^{(\omega)2} \right) \right\} \right\}$$

Where:
t is a vector of q plaintexts, associated to respective measurement series;
m is a random variable modeling said or one said mask;
M is the set of all possible values of m;
$y^{(\omega)}$ is a vector of (d+1) values of y which is a random variable expressing the leakage associated to the $t_i^{(\omega)}$ plaintext neglecting noise; and
$\sigma^{(\omega)}$ is the variance of a measurement noise affecting $x_i^{(\omega)}$, assumed to be zero-centered and normally distributed.

4. The method according to claim 3 wherein the estimator of the secret data is approximated by:

$$\mathcal{D}_{opt}^{d,G,\sigma^\perp}(x^{(*)}, t) = \underset{k \in \mathcal{K}}{\operatorname{argmin}} \sum_{i=1}^{q} \max_{m \in M} \sum_{\omega=0}^{d} (x_i^{(\omega)} - y_i^{(\omega)})^2$$

Where:
t is a vector of q plaintexts, associated to respective measurement series;
m is a random variable modeling said or one said mask;
M is the set of all possible values of m;
$y^{(\omega)}$ is a vector of (d+1) values of y which is a random variable expressing the leakage associated to the plaintext $t_i^{(\omega)}$ neglecting noise; and
$\sigma^{(\omega)}$ is the variance of a measurement noise affecting $x_i^{(\omega)}$, assumed to be zero-centered and normally distributed.

5. The method according to claim 1 wherein said device uses a single mask to pre-compute a masking table independent from the secret data, wherein step a) comprising determining stochastic models of $2^n+1$ leakages, n being the number of bits of data processed by said device, wherein $2^n$ of said leakages are related to the pre-computation of said masking table and one of them is related to the application of said mask and said secret data to a plaintext.

6. The method according to claim 1 wherein step a) comprises:
a1) determining a plurality of deterministic leakage functions and estimating the probability density functions of respective noise contributions, and
a2) using said deterministic leakage functions for identifying a set of measurable quantities whose mutual information with the secret data, considered as a random variable, is different from zero.

7. A method for evaluating the security of a cryptographic device containing at least a memory element storing secret data having a known value, a module for storing or generating at least one mask and a circuit configured to perform cryptographic operations using said secret data and said mask or masks, the method comprising:
a step of recovering the secret data, without using the knowledge of its value, by:
determining stochastic models of a plurality of leakages relating respective measurable quantities to internal states or operations of said cryptographic device, the number of said leakages being greater than the number of said masks;
sending a plurality of command sequences (t) to said device, where each said command sequence causes said device to perform a cryptographic operation on at least one respective plaintext using said secret data and said mask or masks;
during processing of each said cryptographic operation, recording a series of measurements (x) of said measurable quantities; and
computing an estimator of said secret data using the determined stochastic models and by maximizing the conditional joint probability of the recorded measurements given the corresponding plaintexts, averaged over all possible values of said masks, wherein the estimator of the computed secret data is given by:

$$\mathcal{D}_{opt}^d(x^{(*)}, t^{(*)}) = \underset{k \in \mathcal{K}}{\operatorname{argmax}} \prod_{i=1}^{q} \sum_{m^{(*)} \in M^{(*)}} \mathbb{P}(m^{(*)}) \prod_{\omega=0}^{d} p_k(x_i^{(\omega)} | t_i^{(\omega)}, m^{(\omega)})$$

Where:
q is the number of series of measurements performed;
d+1 is the number of measurable quantities which are measure&
k is a possible value of the secret data;
K is the set of all possible values of k;
$m^{(*)}$ is a set of (d+1) random variables modeling the mask or masks, $m^{(\omega)+}$ being one of said random variables;

$M^{(*)}$ is the set of all possible values of said (d+1) random variables;

$t_i^{(\infty)}$ is a plaintext associated to the i-th measurement series;

$t^{(*)}$ is a matrix of q(d+1) plaintexts;

R represents a probability distribution;

$p_k(x|t,m)$ represents the conditional probability that the leakage X takes the value x given t,k and m;

$x_i^{(\infty)}$ is a measurement series associated to the plaintext $t_i^{(\infty)}$; and $x^{(*)}$ is a matrix of q(d+1) measurement results associated with the plaintexts of $t^{(*)}$, said step being repeated a predetermined number of times, greater than one; and a step of determining a success rate of said recovering by comparing the estimators of the secret data determined in the previous step with the known value thereof;

said success rate constituting a metric of the security of the cryptographic device.

\* \* \* \* \*

UNITED STATES PATENT AND TRADEMARK OFFICE
CERTIFICATE OF CORRECTION

PATENT NO. : 10,628,592 B2
APPLICATION NO. : 15/529048
DATED : April 21, 2020
INVENTOR(S) : Sylvain Guilley et al.

Page 1 of 1

It is certified that error appears in the above-identified patent and that said Letters Patent is hereby corrected as shown below:

In the Claims

In Claim 7, Column 16, Line 62, "which are measure&" should be -- which are measured; --.

Signed and Sealed this
Ninth Day of February, 2021

Drew Hirshfeld
*Performing the Functions and Duties of the
Under Secretary of Commerce for Intellectual Property and
Director of the United States Patent and Trademark Office*